US 9,491,699 B2

United States Patent
Nenner et al.

(10) Patent No.: US 9,491,699 B2
(45) Date of Patent: Nov. 8, 2016

(54) METHOD FOR SAVING ENERGY IN OPERATING A FIRST AND SECOND MOBILE COMMUNICATION NETWORKS, MOBILE COMMUNICATION NETWORKS

(75) Inventors: Karl Heinz Nenner, Bornheim (DE); Dieter Jacobsohn, Bonn (DE); Heinz Polsterer, Wagram am Wagram (AT)

(73) Assignees: DEUTSCHE TELEKOM AG, Bonn (DE); T-MOBILE INTERNATIONAL AUSTRIA GMBH, Vienna (AT)

( * ) Notice: Subject to any disclaimer, the term of this patent is extended or adjusted under 35 U.S.C. 154(b) by 328 days.

(21) Appl. No.: 13/985,050
(22) PCT Filed: Feb. 15, 2012
(86) PCT No.: PCT/EP2012/000659
§ 371 (c)(1),
(2), (4) Date: Sep. 10, 2013
(87) PCT Pub. No.: WO2012/110233
PCT Pub. Date: Aug. 23, 2012

(65) Prior Publication Data
US 2013/0344863 A1 Dec. 26, 2013

Related U.S. Application Data
(60) Provisional application No. 61/444,243, filed on Feb. 18, 2011.

(30) Foreign Application Priority Data
Feb. 18, 2011 (EP) .................... 11001344

(51) Int. Cl.
H04W 4/00 (2009.01)
H04W 52/02 (2009.01)
H04W 28/08 (2009.01)
(52) U.S. Cl.
CPC ..... *H04W 52/0203* (2013.01); *H04W 52/0274* (2013.01); *H04W 28/08* (2013.01); *H04W 52/0216* (2013.01); *Y02B 60/50* (2013.01)

(58) Field of Classification Search
None
See application file for complete search history.

(56) References Cited

U.S. PATENT DOCUMENTS
2011/0313578 A1* 12/2011 Jones et al. .................... 700/291

FOREIGN PATENT DOCUMENTS
WO WO 0106847 A1 2/2001

OTHER PUBLICATIONS
M. Marsan and M. Meo; "Energy Efficient management of two Cellular Access Networks", ACM SIGMETRICS Performance Evaluation Review, vol. 37 Mar. 4, 2010, pp. 69-73, XP002635925.
(Continued)

*Primary Examiner* — Charles Appiah
*Assistant Examiner* — Alexander Yi
(74) *Attorney, Agent, or Firm* — Leydig, Voit & Mayer, Ltd.

(57) ABSTRACT

A method for saving energy in operating first and second mobile communication networks by invoking an energy saving operational mode of the first and second mobile communication networks includes: operating a first radio access network in a first operational mode for peak time usage of the first mobile communication network, and in a second operational mode for off-peak time usage of the first mobile communication network; and invoking, at least partly during off-peak time usage of the first and second mobile communication networks, the energy saving operational mode of the combination of the first and second mobile communication networks such that the first radio access network is operated in the second operational mode while the second radio access network is operated such that coverage and capacity requirements in a geographic area are ensured by the combination of the first and second mobile communication networks.

12 Claims, 1 Drawing Sheet

(56) References Cited

OTHER PUBLICATIONS

Motorola: "Initial requirements for energy savings", 3GPP TSG SA WG2, S2-110733, Feb. 15, 2011, p. 1, XP002635927.
3GPP; "3rd Generation Partnership Project; Technical Specification Group Core Network and Terminals Study on impacts on signaling between UE and core network from energy saving (Release 10)", 3GPP TR 24,826 V0.5.0, Feb. 3, 2011, pp. 1-30, XP002635926.
3GPP TR 25.927 V10.0.0 (Sep. 2010); 3rd Generation Partnership Project; Technical Specification Group Radio Access Network; Solutions for energy saving within UTRA Node B (Release 10).
3GPP TR 32.826 V10.0,0 (Mar. 2010); 3rd Generation Partnership Project; Technical Specification Group Services and System Aspects; Telecommunication management; Study on Energy Savings Management (ESM); (Release 10).

* cited by examiner

METHOD FOR SAVING ENERGY IN OPERATING A FIRST AND SECOND MOBILE COMMUNICATION NETWORKS, MOBILE COMMUNICATION NETWORKS

CROSS-REFERENCE TO RELATED APPLICATIONS

This application is a U.S. National Phase application under 35 U.S.C. §371 of International Application No. PCT/EP2012/000659, filed on Feb. 15, 2012, and claims benefit to European Patent Application No. EP 11001344.8, filed on Feb. 18, 2011, and to U.S. Provisional Application No. 61/444,243, filed on Feb. 18, 2011. The International Application was published in English on Aug. 23, 2012 as WO 2012/110233 A1 under PCT Article 21(2).

FIELD

The present invention relates inter alia to a method for saving energy in operating a first and second mobile communication networks by invoking an energy saving operational mode of the first and second mobile communication networks, wherein at least a radio access network of the first and second mobile communication networks is operated in a second operational mode which corresponds to an off-peak time usage of one of the mobile communication networks such that energy or power consumption is saved.

BACKGROUND

In most regions or geographical areas, a time-dependent usage pattern of communication is reality, wherein typically more than one mobile communication network is available within a given region or geographical area, wherein each of these mobile communication networks are serving their respective customers within that region or geographical area. In general this implies that during periods of low demand (e. g. during the night) each of the mobile communication networks is overdimensioned because normally the mobile communication networks are designed for peak time (usually day time) demand. This results in unnecessary energy consumption by the mobile communication networks during those low demand periods. The low demand periods are hereinafter also called off-peak times.

In the context of the Third Generation Partnership Project (3GPP), attempts have already been made regarding solutions for energy saving of components of mobile communication networks. Such energy savings are especially realized by switching off radio equipment components on the networks side. As a consequence, a user equipment currently being served by the radio equipment subject to being switched off will have to find an alternative, either in the same RAT (Radio Access Technology), or in another RAT (Radio Access Technology). Examples of such specifications include 3GPP TR 24.826 V0.5.0, 3GPP TR 25.927 V10.0.0, and 3GPP TR 32.826 V10.0.0.

However these solutions only provide energy saving mechanisms within one mobile communication network, i.e. within the network of one operator of a mobile communication network. Hence each individual operator's network has to be capable of scaling its capacity, and power consumption, between peak and off-peak demand. In areas of high peak-time demand, i.e. where the network has a high capacity, a high scaling factor between the peak time and the off-peak time—where there might be very few users on the network—is required, which might not be technically feasible. Moreover, this problem is aggravated if the said operator's network supports two different RATs, e.g. GERAN and UTRAN in 3GPP-based networks. In this case, at least one GERAN cell and one UTRAN cell has to be kept available in off-peak times in order to support both the GSM and UMTS terminals, even in cases where a single cell of any RAT would be sufficient to sustain the total number of terminals during off-peak time. Thus, in many scenarios, the efficiency of the energy saving mechanisms suffers from the "single-operator" limitation.

SUMMARY

In an embodiment, the present invention provides a method for saving energy in operating first and second mobile communication networks by invoking an energy saving operational mode of the first and second mobile communication networks. The first mobile communication network includes a first radio access network for covering a geographic area and a first core network. The geographic area is also covered by the second radio access network of the second mobile communication network. The second mobile communication network includes a second core network. The method includes: operating the first radio access network in a first operational mode for peak time usage of the first mobile communication network, and in a second operational mode for off-peak time usage of the first mobile communication network; and invoking, at least partly during off-peak time usage of the first and second mobile communication networks, the energy saving operational mode of the combination of the first and second mobile communication networks such that the first radio access network is operated in the second operational mode while the second radio access network is operated such that coverage and capacity requirements in the geographic area are ensured by the combination of the first and second mobile communication networks. With respect to the geographic area, at least the first radio access network and the second radio access network as well as at least parts of the first and second core networks are shared network components of a network sharing operation of the first and second mobile communication network. With respect to the geographic area and during the energy saving operational mode of the first and second mobile communication networks, the first radio access network and the second radio access network are commonly operated to form a logically different mobile communication network in the geographic area. For a subscriber of the first or the second mobile communication network using the logically different mobile communication network within the geographic area, a roaming procedure is invoked.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, a method is provided for saving energy in operating a first and second mobile communication networks by invoking an energy saving operational mode of the first and second mobile communication networks, wherein advantages drawn from the existence of the overall mobile communication infrastructure in a geographical area, i.e. comprising different mobile communication networks (including their different layers or parts such as layers of different radio access technologies) such that operational costs can be reduced, energy and power consumption minimized and nevertheless the service level of a user of the mobile communication networks preserved even during off-peak time periods or periods of low usage such as during the night.

The method for saving energy in operating a first and second mobile communication networks is provided by invoking an energy saving operational mode of the first and second mobile communication networks, wherein the first mobile communication network comprises a first radio access network for covering a geographic area and a first core network, wherein the geographic area is also covered by the second radio access network of a second mobile communication network, the second mobile communication network comprising a second core network, wherein the first radio access network is able to be operated in a first operational mode for peak time usage of the first mobile communication network, and in a second operational mode for off-peak time usage of the first mobile communication network, wherein at least partly during off-peak time usage of the first and second mobile communication networks, the energy saving operational mode of the combination of the first and second mobile communication networks is invoked such that the first radio access network is operated in the second operational mode while the second radio access network is operated such that coverage and capacity requirements in the geographic area are ensured by the combination of the first and second mobile communication network, or wherein the second radio access network is able to be operated in a first operational mode for peak time usage of the second mobile communication network, and in a second operational mode for off-peak time usage of the second mobile communication network, wherein at least partly during off-peak time usage of the combination of the first and second mobile communication networks, the energy saving operational mode of the first and second mobile communication networks is invoked such that the second radio access network is operated in the second operational mode while the first radio access network is operated such that coverage and capacity requirements in the geographic area are ensured by the combination of the first and second mobile communication networks.

In a further embodiment, a method is provided for saving energy in operating a first and second mobile communication networks by invoking an energy saving operational mode of the first and second mobile communication networks, wherein the first mobile communication network comprises a first radio access network for covering a geographic area and a first core network, wherein the geographic area is also covered by the second radio access network of a second mobile communication network, the second mobile communication network comprising a second core network, wherein the first radio access network is able to be operated in a first operational mode for peak time usage of the first mobile communication network, and in a second operational mode for off-peak time usage of the first mobile communication network, wherein at least partly during off-peak time usage of the first and second mobile communication networks, the energy saving operational mode of the combination of the first and second mobile communication networks is invoked such that the first radio access network is operated in the second operational mode while the second radio access network is operated such that coverage and capacity requirements in the geographic area are ensured by the combination of the first and second mobile communication network, or wherein the second radio access network is able to be operated in a first operational mode for peak time usage of the second mobile communication network, and in a second operational mode for off-peak time usage of the second mobile communication network, wherein at least partly during off-peak time usage of the combination of the first and second mobile communication networks, the energy saving operational mode of the first and second mobile communication networks is invoked such that the second radio access network is operated in the second operational mode while the first radio access network is operated such that coverage and capacity requirements in the geographic area are ensured by the combination of the first and second mobile communication networks, wherein with respect to the geographic area, at least the first radio access network and the second radio access network as well as at least parts of the first and second core networks are shared network components of a network sharing operation of the first and second mobile communication network, wherein the network sharing operation is applied to the energy saving operational mode of the first and second mobile communication networks only, and wherein during peak time usage of the mobile communication networks network sharing is unapplied, wherein with respect to the geographic area and during the energy saving operational mode of the first and second mobile communication networks, the first radio access network and the second radio access network are commonly operated to form a logically different mobile communication network in the geographic area, wherein for a subscriber of the first or the second mobile communication network using the logically different mobile communication network within the geographic area, a roaming procedure is invoked.

The total available network capacity of all the mobile communication networks installed or existent in a geographical area can automatically be aligned to the overall actual or current demand in that area.

Thus, it is possible to pool a plurality of mobile communication networks. E. g., in case of two mobile communication networks that are installed in parallel in a geographical area, these are pooled for serving a reduced number of users of these mobile communication networks during off-peak times, e. g. during the night or the like. This pooling or sharing of network resources is also possible if more than two parallel mobile communication system are available in a geographical area.

For example, the benefit of energy savings and cost savings for operating the mobile communication networks can be realized according to embodiments of the present invention if the concerned operators share their mobile communication networks such that, e.g., when multiple (or a plurality) of mobile communication networks exist, only a subset of these mobile communication network is kept running during the night and serve all customers (subscribers) of the three mobile communication networks. The desired energy saving is thus achieved by switching off the other two mobile communication networks (or parts of the two other mobile communication networks within the geographical area or respective region) during that period. It is possible and preferred according to embodiments of the present invention that—triggered by low demand—in case that, e.g., three mobile communication networks are present in a geographical area, in a first step only one of the three mobile communication networks is switched off, and—triggered by an even lower demand—a further mobile communication network of the (initially) three mobile communication networks is switched off such that only one of the three mobile communication network provides radio coverage.

In the context of the present invention, the wording "network sharing" relates to network sharing according to the definitions of the 3GPP standardization documents. In the context of the present invention, the energy saving operational mode of the first and second mobile communication networks (i.e. of the combination of the first and second mobile communication networks) is preferably invoked automatically according to the current demand of mobile communication services in the geographical area. Such automatic adaptation—including the demand-triggered enabling and disabling of network sharing—can be achieved by using standardized mechanisms for shutting down mobile communication networks or parts thereof for energy saving purposes and by intelligently combining such energy saving mechanisms and network sharing mechanisms with an associated control mechanism. Thereby, it is possible according to embodiments of the present invention, that the energy consumption during off-peak time can be drastically reduced.

It is preferred that with respect to the geographic area, at least the first radio access network and the second radio access network are shared network components of a network sharing operation of the first and second mobile communication network, the network sharing operation being applied to both peak time usage of the mobile communication networks and to the energy saving operational mode of the first and second mobile communication networks.

Thereby it is advantageously possible, that complete network parts such as the radio access network parts of a mobile communication network of an operator in a geographical area can be switched off or switched to a power saving second operational mode, and still provide a radio coverage in the geographical area concerned by means of using an other mobile communication network. In the perspective of the shared network concept, this means that parts (e.g. roughly one half of the network capacity in case that there are two operators providing full radio coverage in the geographical area (and provided that the capacity of the two mobile communication networks are roughly identical), or roughly one third or two thirds of the network capacity in case that there are three operators providing full radio coverage in the geographical area (and provided that the capacity of the three mobile communication networks are roughly identical)) are switched off or shut down, and automatically all still necessary communication will be provided by the parts of the shared network which remain switched on. This result can be realized such that, e.g. the mobile communication network of one of the operators which is still operating its mobile communication network also during the specific off-peak time period is switched on while the other mobile communication network is at least partly switched off, but this result can also be achieved such that, e.g. the mobile communication networks of all the participating operators are operated in a second operational mode and the target network coverage and capacity is provided by the combination of the first and second mobile communication networks.

Furthermore, it is preferred that with respect to the geographic area, at least the first radio access network and the second radio access network as well as at least parts of the first and second core networks are shared network components of a network sharing operation of the first and second mobile communication network, the network sharing operation being applied to both peak time usage of the mobile communication networks and to the energy saving operational mode of the first and second mobile communication networks.

Likewise according to this embodiment of the shared network concept, not only the radio access network parts but also (at least parts of) the first and second core networks are shared network components and allow a still further reduction in energy consumption (by applying the strategies (mentioned above with respect primarily to the first and second radio access networks) also to the first and second core networks).

Still furthermore, it is preferred that with respect to the geographic area, at least the first radio access network and the second radio access network are shared network components of a network sharing operation of the first and second mobile communication network, wherein the network sharing operation is applied to the energy saving operational mode of the first and second mobile communication networks only, and wherein during peak time usage of the mobile communication networks network sharing is unapplied.

Thereby, it is advantageously possible that the network sharing concept can be modified such that during normal (peak time) operation, e. g., at daytime, the mobile communication networks available in the geographical area are not shared between the operators. Only once the demand has decreased below a certain threshold, a network sharing operation is applied to the participating mobile communication networks such that a controlled switch-off of a part of one or more of the concerned mobile communication networks, especially the radio access network, is realized. Again, the remaining mobile communication network or networks are serving all the subscribers of the participating mobile communication networks.

According to yet another embodiment of the present invention, it is preferred that with respect to the geographic area, at least the first radio access network and the second radio access network as well as at least parts of the first and second core networks are shared network components of a network sharing operation of the first and second mobile communication network, wherein the network sharing operation is applied to the energy saving operational mode of the first and second mobile communication networks only, and wherein during peak time usage of the mobile communication networks network sharing is unapplied.

Furthermore, it is preferred that with respect to the geographic area and during the energy saving operational mode of the first and second mobile communication networks, the first radio access network and the second radio access network are commonly operated to form a logically different mobile communication network in the geographic area, wherein for a subscriber of the first or the second mobile communication network using the logically different mobile communication network within the geographic area, a roaming procedure is invoked.

According to this further embodiment of the present invention, it is advantageously possible to use normal roaming procedures to be applied such that all users of the participating mobile communication networks are treated as roaming users. This means, that during normal (i.e. peak time) operation, the first mobile communication network serves its respective subscriber, the second mobile communication network serves its respective subscribers (and perhaps a third mobile communication network serve its respective subscribers). When the off-peak operation mode is entered, i.e. the energy saving operational mode of the mobile communication networks is activated, the serving mobile communication network (which is not switched off) will behave as a further mobile communication network, i.e. it will be detected as a logically different mobile communication network.

According to a further embodiment of the present invention, it is preferred that with respect to the geographic area and during the energy saving operational mode of the first and second mobile communication networks, a roaming procedure within the second mobile communication network is invoked for a subscriber of the first mobile communication network in case that the first radio access network is operated in the second operational mode, and a roaming procedure within the first mobile communication network is invoked for a subscriber of the second mobile communication network in case that the second radio access network is operated in the second operational mode.

Thereby, it is advantageously possible to use established roaming procedures for off-peak times such that, e. g. the subscribers of the first mobile communication network are allowed as roaming users in the second mobile communication network during off-peak time periods and in case that the first mobile communication network or parts thereof are in a second operational mode, e. g. switched off, or vice versa. Furthermore, it is possible that the first mobile communication network and the second mobile communication network are operated (e.g. in an energy saving second operational mode), and roaming procedures are invoked in case that the capacity needs exceed the capacity of one of the first or second mobile communication network.

According to further embodiments of the present invention,
the first radio access network and the second radio access network are both a GERAN type radio access network (GSM (Global System for Mobile communications)/EDGE (Enhanced Data rates for GSM Evolution) Radio Access Network), or
the first radio access network and the second radio access network are both a UTRAN type radio access network (UMTS (Universal Mobile Telecommunications System) Terrestrial Radio Access Network), or
the first radio access network and the second radio access network are both an E-UTRAN type radio access network (Evolved UTRAN (UMTS Terrestrial Radio Access Network)).

According to embodiments of the present invention, energy saving methods are proposed for the case that at least two (but also three or four or even more) more or less complete infrastructures of mobile communication networks are present or exist in a specific geographical area, wherein a coordinated switching-off of parts of the mobile communication networks would result in a much bigger energy saving potential than by using conventional energy saving mechanisms within a mobile communication network structure of one single operator, e. g. comprising a network layer of a 2G (GSM) mobile communication network, a GERAN layer, a UTRAN layer and/or an E-UTRAN layer. Therefore it is preferred that what is called the first radio access network and second radio access network in the context of the present invention, refers to radio access layers of mobile communication networks operated by different operators and preferably of the same radio access technology such as a GERAN type radio access network for both the first and second radio access network, or a UTRAN radio access network for both the first and second radio access network or an E-UTRAN type radio access network for both the first and second radio access network.

Furthermore, it is preferred that
the first radio access network is a UTRAN type radio access network (UMTS (Universal Mobile Telecommunications System) Terrestrial Radio Access Network) or a GERAN type radio access network (GSM (Global System for Mobile communications)/EDGE (Enhanced Data rates for GSM Evolution) Radio Access Network), and the second radio access network is an E-UTRAN type radio access network (Evolved UTRAN (UMTS Terrestrial Radio Access Network)), or that
the first radio access network is a GERAN type radio access network (GSM (Global System for Mobile communications)/EDGE (Enhanced Data rates for GSM Evolution) Radio Access Network), and the second radio access network is a UTRAN type radio access network (UMTS Terrestrial Radio Access Network).

Of course, it is also possible that the first radio access network and the second radio access network are of a different type of radio access technology such as the first radio access network being a UTRAN type radio access network, and the second radio access network being an E-UTRAN type radio access network (or vice versa), or that the first radio access network is a GERAN type radio access network and the second radio access network is a UTRAN type radio access network (or vice versa), or that the first radio access network is a GERAN type radio access network and the second radio access network is an E-UTRAN type radio access network (or vice versa).

It is furthermore preferred that the energy saving operational mode of the first and second mobile communication networks is invoked during off-peak time situation of the first and second mobile communication networks, wherein the overall time of the energy saving operational mode of the first and second mobile communication network is divided between the first radio access network being operated in the second operational mode and the second radio access network being operated in the second operational mode, the overall time of the energy saving operational mode being preferably divided on a hourly or daily or weekly or monthly basis.

Thereby, it is advantageously possible, that the benefits of the reduced power consumption or energy saving of the inventive method can be easily shared between the different network operators of the mobile communication networks involved using the inventive method, especially by defining that the energy saving second operational mode is invoked for example by the first mobile communication network (or parts thereof) during one day and the energy saving second operational mode invoke for the second mobile communication network on the next day. Thereby, it might be possible to define that on even days during a year (days 2, 4, 6, . . . ) the first mobile communication network is switched to the second operational mode in case that the requested network load is sufficiently low, and that on uneven days (days 1, 3, 5, . . . ) the second mobile communication network is switched to the second operational mode during off-peak time periods. In case that three or more operators of mobile communication networks use the inventive method, of course a rotating shut down of one or two (or more) mobile communication networks during off-peak time periods is possible and preferred according to the present invention in order to ensure, that the burden of running the mobile communication network in the first operational mode (i.e. switched on) is distributed on all participating mobile communication networks.

Embodiments of the present invention also relate to mobile communication networks as first and second mobile communication networks for saving energy during operation by invoking an energy saving operational mode of the first and second mobile communication networks, wherein the first mobile communication network comprises a first radio access network for covering a geographic area and a first core network, wherein the geographic area is also covered by a second radio access network of the second mobile communication network, the second mobile communication network comprising a second core network, wherein the first radio access network is configured such as to be operated in a first operational mode for peak time usage of the first mobile communication network, and in a second operational mode for off-peak time usage of the first mobile communication network, wherein the first mobile communication network is configured such that at least partly during off-peak time usage of the first and second mobile communication networks, the energy saving operational mode is invoked and the first radio access network being operated in the second operational mode while the second radio access network ensuring coverage in the geographic area, or wherein the second radio access network is configured such as to be operated in a first operational mode for peak time usage of the second mobile communication network and in a second operational mode for off-peak time usage of the second mobile communication network, wherein the second mobile communication network is configured such that at least partly during off-peak time usage of the first and second mobile communication networks, the energy saving operational mode is invoked and the second radio access network being operated in the second operational mode while the first radio access network ensuring coverage in the geographic area.

Embodiments of the present invention furthermore also relate to mobile communication networks as first and second mobile communication networks for saving energy during operation by invoking an energy saving operational mode of the first and second mobile communication networks, wherein the first mobile communication network comprises a first radio access network for covering a geographic area and a first core network, wherein the geographic area is also covered by a second radio access network of the second mobile communication network, the second mobile communication network comprising a second core network, wherein the first radio access network is configured such as to be operated in a first operational mode for peak time usage of the first mobile communication network, and in a second operational mode for off-peak time usage of the first mobile communication network, wherein the first mobile communication network is configured such that at least partly during off-peak time usage of the first and second mobile communication networks, the energy saving operational mode is invoked and the first radio access network being operated in the second operational mode while the second radio access network ensuring coverage in the geographic area, or wherein the second radio access network is configured such as to be operated in a first operational mode for peak time usage of the second mobile communication network and in a second operational mode for off-peak time usage of the second mobile communication network, wherein the second mobile communication network is configured such that at least partly during off-peak time usage of the first and second mobile communication networks, the energy saving operational mode is invoked and the second radio access network being operated in the second operational mode while the first radio access network ensuring coverage in the geographic area, wherein with respect to the geographic area, at least the first radio access network and the second radio access network as well as at least parts of the first and second core networks are shared network components of a network sharing operation of the first and second mobile communication network, wherein the network sharing operation is applied to the energy saving operational mode of the first and second mobile communication networks only, and wherein during peak time usage of the mobile communication networks network sharing is unapplied, wherein with respect to the geographic area and during the energy saving operational mode of the first and second mobile communication networks, the first radio access network and the second radio access network are commonly operated to form a logically different mobile communication network in the geographic area, wherein for a subscriber of the first or the second mobile communication network using the logically different mobile communication network within the geographic area, a roaming procedure is invoked.

Thereby it is advantageously possible to realize energy saving mechanisms by using a plurality of mobile communication networks.

Furthermore, embodiments of the present invention relate to a program comprising a computer readable program code for controlling the inventive mobile communication networks.

Embodiments of the present invention also relate to a computer program product comprising an inventive program.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
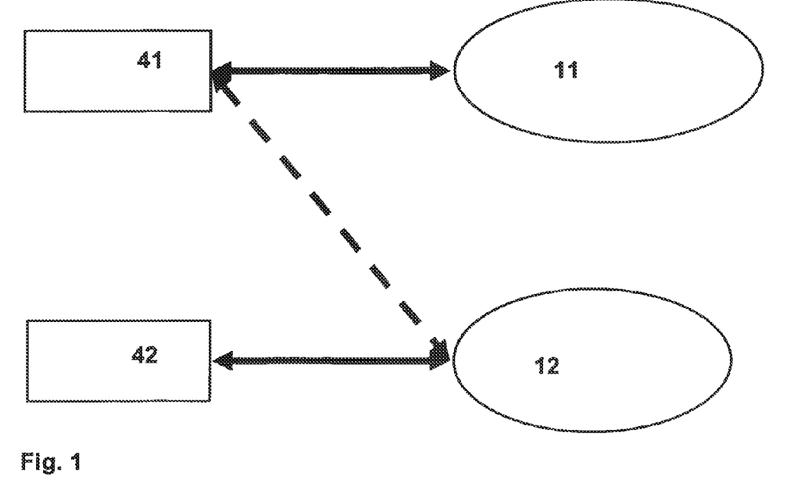
FIG. 1 schematically illustrates an example of the use of the method according to an embodiment of the present invention.

In FIG. 1, the effect of the method in an embodiment is schematically shown. A first mobile communication network 11 and a second mobile communication network 12 are provided in a geographical area and provide both a radio coverage in the given geographical area. A first user equipment 41 is normally attached to the first mobile communication network 11 as the first user equipment 41 represents a subscriber of the first mobile communication network 11. This is represented by a drawn-through arrow in FIG. 1. Likewise, the second user equipment 42 is usually attached to the second mobile communication network 12 as the second user equipment 42 represents a subscriber of the second mobile communication network 12. This is represented by a drawn-through arrow in FIG. 1. In case that for reasons of energy saving the first mobile communication network 11 is switched off or switched to a power saving second operational mode, the first user equipment 41 is attached to the second mobile communication system 12 in case that the method according to the embodiment is applied. This can, for example, be provided by way of a network sharing concept where at least during off-peak time periods the first and second mobile communication networks 11, 12 are shared networks. Alternatively the first and second mobile communication networks 11, 12 provide a further logical mobile communication network.

Figure 2:
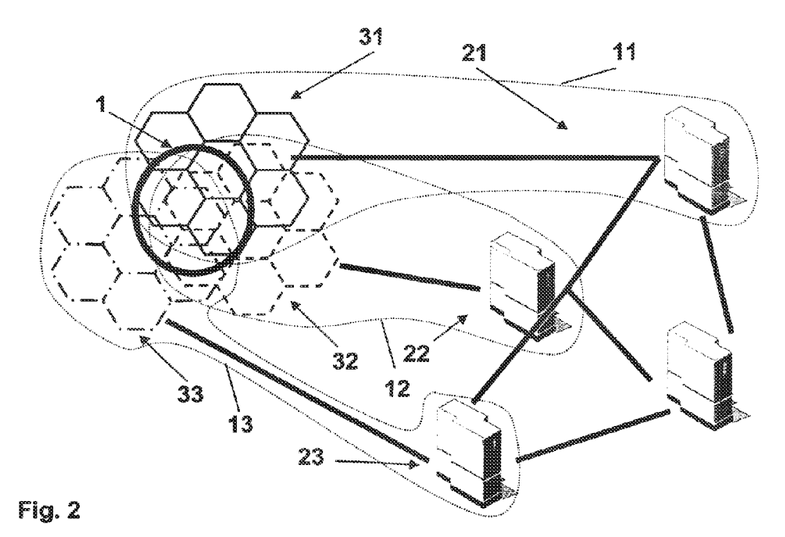
FIG. 2 schematically illustrates a basic architecture of a multitude of mobile communication networks according to an embodiment of the present invention.

In FIG. 2, an exemplary network architecture for using the method in an embodiment is schematically shown. In the example shown in FIG. 2, a first mobile communication network 11, a second mobile communication network 12 and a third mobile communication network 13 are schematically shown. The first mobile communication network 11 comprises a first core network 21 and a first radio access network 31. The second mobile communication network 12 comprises a second core network 22 and a second radio access network 32. The third mobile communication network 13 comprises a third core network 23 and a third radio access network 33. The first radio access network 31 is shown using drawn-through lines of (schematically hexagonal) network cells. The second radio access network 32 is shown using dashed lines of (schematically hexagonal) network cells. The third radio access network 33 is shown using dashed-and-dotted lines of (schematically hexagonal) network cells. Furthermore, FIG. 2 shows a geographical area 1 which is served by all three mobile communication networks 11, 12, 13. One example of such a geographical area 1 could be an airport where during daytime a big need for capacity is necessary. Typically, most of the airports are covered by more than one network, in the example by three mobile communication networks. A lot of airports are closed or have restricted traffic during night time, resulting in much lower needs for communication. The unused capacity nevertheless requires the mobile communication networks 11, 12, 13 to be operational, especially the corresponding radio access networks 31, 32, 33. The method according to embodiments of the present invention provides a solution for greatly reducing the needs in energy consumption of at least one of the different mobile communication networks 11, 12, 13 by providing a second operational mode for the participating networks that requires less energy than a first operational mode of the mobile communication networks 11, 12, 13.

In FIG. 2, examples of network components of the first, second and third core networks 21, 22, 23 are schematically shown. These network components shown are (core) network gateways, e.g., Serving GPRS Support Node (SGSN) or Gateway GPRS Support Node (GGSN), and/or Mobile Switching Centers.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention claimed is:

1. A method for saving energy in operating first and second mobile communication networks by invoking an energy saving operational mode corresponding to a combination of the first and second mobile communication networks, wherein the first mobile communication network comprises a first radio access network for covering a geographic area and a first core network, wherein the geographic area is also covered by a second radio access network of the second mobile communication network, the second mobile communication network comprising a second core network, the method comprising:

operating the first radio access network in a first operational mode for peak time usage of the first mobile communication network and operating the second radio access network in the first operational mode for peak time usage of the second mobile communication network; and invoking, at least partly during off-peak time usage of the first and second mobile communication networks, the energy saving operational mode corresponding to the combination of the first and second mobile communication networks, wherein during the energy saving operational mode, the coverage and capacity requirements in the geographic area are ensured by the combination of the first and second mobile communication networks, and wherein an overall time of the energy saving operational mode corresponding to the combination of the first and second mobile communication networks is allocated between:
- the first radio access network being operated in the first operational mode while the second radio access network is operated in a second operational mode; and
- the first radio access network being operated in the second operational mode while the second radio access network is operated in the second operational mode;

wherein operation of the first radio access network in the second operational mode consumes less power than operation of the first radio access network in the first operational mode and operation of the second radio access network in the second operational mode consumes less power than operation of the second radio access in the first operational mode;

wherein with respect to the geographic area, at least the first radio access network and the second radio access network as well as at least parts of the first and second core networks are shared network components of a network sharing operation of the first and second mobile communication networks; and wherein with respect to the geographic area and during the energy saving operational mode corresponding to the combination of the first and second mobile communication networks, the first radio access network and the second radio access network are commonly operated to form a logically different mobile communication network in the geographic area, wherein for a subscriber of the first or the second mobile communication network using the logically different mobile communication network within the geographic area, a roaming procedure is invoked.

2. The method according to claim 1, wherein the network sharing operation is applied to the energy saving operational mode corresponding to the combination of the first and second mobile communication networks only, and wherein during peak time usage of the mobile communication networks, network sharing is not applied.

3. The method according to claim 1, wherein the network sharing operation is applied to both peak time usage of the first and second mobile communication networks and to the energy saving operational mode corresponding to the combination of the first and second mobile communication networks.

4. The method according to claim 1, wherein with respect to the geographic area and during the energy saving operational mode corresponding to the combination of the first and second mobile communication networks, a roaming procedure within the second mobile communication network is invoked for a subscriber of the first mobile communication network in case that the first radio access network is operated in the second operational mode.

5. The method according to claim 1, wherein the first radio access network and the second radio access network are both GERAN (GSM (Global System for Mobile communications)/EDGE (Enhanced Data rates for GSM Evolution) Radio Access Network)-type radio access networks.

6. The method according to claim 1, wherein the first radio access network and the second radio access network are both UTRAN (UMTS (Universal Mobile Telecommunications System) Terrestrial Radio Access Network)-type radio access networks.

7. The method according to claim 1, wherein the first radio access network and the second radio access network are both E-UTRAN (Evolved UTRAN (UMTS Terrestrial Radio Access Network))-type radio access networks.

8. The method according to claim 1, wherein the first radio access network is a UTRAN (UMTS (Universal Mobile Telecommunications System) Terrestrial Radio Access Network)-type radio access network or a GERAN (GSM (Global System for Mobile communications)/EDGE (Enhanced Data rates for GSM Evolution) Radio Access Network)-type radio access network, and the second radio access network is an E-UTRAN (Evolved UTRAN (UMTS Terrestrial Radio Access Network))-type radio access network.

9. The method according to claim 1, wherein the first radio access network is a GERAN (GSM (Global System for Mobile communications)/EDGE (Enhanced Data rates for GSM Evolution) Radio Access Network)-type radio access network, and the second radio access network is a UTRAN (UMTS Terrestrial Radio Access Network)-type radio access network.

10. The method according to claim 1, wherein the overall time of the energy saving operational mode is allocated on a hourly or daily or weekly or monthly basis.

11. A system, comprising first and second mobile communication networks for saving energy during operation by invoking an energy saving operational mode corresponding to a combination of the first and second mobile communication networks, wherein the first mobile communication network comprises a first radio access network for covering a geographic area and a first core network, wherein the geographic area is also covered by a second radio access network of the second mobile communication network, the second mobile communication network comprising a second core network:
- wherein the first radio access network is configured to be operated in a first operational mode for peak time usage of the first mobile communication network, and wherein the second radio access network is configured to be operated in the first operational mode for peak time usage of the second mobile communication network;
- wherein the first and second mobile communication networks are configured such that at least partly during off-peak time usage of the combination of the first and second mobile communication networks, the energy saving operational mode corresponding to the combination of the first and second mobile communication networks, wherein during the energy saving operational mode, coverage and capacity requirements in the geographic area are ensured by the combination of the first and second mobile communication networks, and wherein an overall time of the energy saving operational mode corresponding to the combination of the first and second mobile communication networks is allocated between:
  - the first radio access network being operated in the first operational mode while the second radio access network is operated in a second operational mode; and the first radio access network being operated in the second operational mode while the second radio access network is operated in the second operational mode;

wherein operation of the first radio access network in the second operational mode consumes less power than operation of the first radio access network in the first operational mode and operation of the second radio access network in the second operational mode consumes less power than operation of the second radio access in the first operational mode;

wherein with respect to the geographic area, at least the first radio access network and the second radio access network as well as at least parts of the first and second core networks are shared network components of a network sharing operation of the first and second mobile communication networks, wherein the network sharing operation is applied to the energy saving operational mode of the first and second mobile communication networks only, and wherein during peak time usage of the mobile communication networks network sharing is not applied;

wherein with respect to the geographic area and during the energy saving operational mode corresponding to the combination of the first and second mobile communication networks, the first radio access network and the second radio access network are commonly operated to form a logically different mobile communication network in the geographic area, wherein for a subscriber of the first or the second mobile communication network using the logically different mobile communication network within the geographic area, a roaming procedure is invoked.

12. A non-transitory computer-readable medium having processor-executable instructions stored thereon for saving energy in operating first and second mobile communication networks by invoking an energy saving operational mode corresponding to a combination of the first and second mobile communication networks, wherein the first mobile communication network comprises a first radio access network for covering a geographic area and a first core network, wherein the geographic area is also covered by a second radio access network of the second mobile communication network, the second mobile communication network comprising a second core network, the processor-executable instructions, when executed by a processor, causing the following steps to be performed:

operating the first radio access network in a first operational mode for peak time usage of the first mobile communication network and operating the second radio access network in the first operational mode for peak time usage of the second mobile communication network; and invoking, at least partly during off-peak time usage of the first and second mobile communication networks, the energy saving operational mode corresponding to the combination of the first and second mobile communication networks, wherein during the energy saving operational mode, the coverage and capacity requirements in the geographic area are ensured by the combination of the first and second mobile communication networks, and wherein an overall time of the energy saving operational mode corresponding to the combination of the first and second mobile communication networks is allocated between:

the first radio access network being operated in the first operational mode while the second radio access network is operated in a second operational mode; and the first radio access network being operated in the second operational mode while the second radio access network is operated in the second operational mode;

wherein operation of the first radio access network in the second operational mode consumes less power than operation of the first radio access network in the first operational mode and operation of the second radio access network in the second operational mode consumes less power than operation of the second radio access in the first operational mode;

wherein with respect to the geographic area, at least the first radio access network and the second radio access network as well as at least parts of the first and second core networks are shared network components of a network sharing operation of the first and second mobile communication networks, wherein the network sharing operation is applied to the energy saving operational mode corresponding to the first and second mobile communication networks only, and wherein during peak time usage of the first and second mobile communication networks the network sharing operation is not applied;

wherein with respect to the geographic area and during the energy saving operational mode corresponding to the combination of the first and second mobile communication networks, the first radio access network and the second radio access network are commonly operated to form a logically different mobile communication network in the geographic area, wherein for a subscriber of the first or the second mobile communication network using the logically different mobile communication network within the geographic area, a roaming procedure is invoked.

* * * * *